United States Patent
Kasparick et al.

(10) Patent No.: US 11,356,150 B2
(45) Date of Patent: Jun. 7, 2022

(54) CELLULAR COMMUNICATION NETWORK USING A USER EQUIPMENT IDENTIFIER

(71) Applicant: Fraunhofer-Gesellschaft zur Foerderung der angewandten Forschung e.V., Munich (DE)

(72) Inventors: Martin Kasparick, Berlin (DE); Renato Luis Garrido Cavalcante, Berlin (DE); Dennis Wieruch, Berlin (DE); Josef Bernhard, Nabburg (DE); Gerd Kilian, Erlangen (DE); Benjamin Sackenreuter, Buckenhof (DE); Bernd Holfeld, Berlin (DE); Thomas Fehrenbach, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/523,774

(22) Filed: Jul. 26, 2019

(65) Prior Publication Data

US 2019/0349032 A1    Nov. 14, 2019

Related U.S. Application Data

(63) Continuation of application No. PCT/EP2018/053061, filed on Feb. 7, 2018.

(30) Foreign Application Priority Data

Feb. 8, 2017    (EP) .................................... 17155201

(51) Int. Cl.
*H04B 7/0413*    (2017.01)
*H04W 64/00*    (2009.01)
(Continued)

(52) U.S. Cl.
CPC ......... *H04B 7/0413* (2013.01); *H04B 7/0617* (2013.01); *H04W 16/28* (2013.01);
(Continued)

(58) Field of Classification Search
CPC . H04W 72/042; H04W 48/16; H04W 72/085; H04W 74/0833; H04L 1/0026
See application file for complete search history.

(56) References Cited

U.S. PATENT DOCUMENTS 7,620,019 B1 * 11/2009 Smith .................. H04B 7/0617
370/334
2011/0124360 A1    5/2011 Sagfors et al.
(Continued)

FOREIGN PATENT DOCUMENTS

| CN | 101904198 A | 12/2010 |
| CN | 103999528 A | 8/2014 |
| WO | 2009082333 A1 | 7/2009 |

OTHER PUBLICATIONS

3GPP TS 36.331 v13.1.0 (Mar. 2016), "3rd Generation Partnership Project; Technical Specification Group Radio Access Network; Evolved Universal Terrestrial Radio Access (E-UTRA); Radio Resource Control (RRC); Protocol specification (Release 13)".
(Continued)

*Primary Examiner* — David S Huang
(74) *Attorney, Agent, or Firm* — Perkins Coie LLP; Michael A. Glenn

(57) ABSTRACT

The present invention concerns a cellular communication network having a base station serving a radio cell and at least one user equipment located within the radio cell, wherein the base station is configured to receive a radio signal from the user equipment and to determine at least one signal property of the received radio signal, wherein the base station is further configured to assign a user equipment identifier to the user equipment based on the a least one determined
(Continued)

signal property. The present invention further concerns a base station to be used in the above mentioned cellular network as well as corresponding methods.

21 Claims, 7 Drawing Sheets

(51) Int. Cl.
  *H04B 7/06*   (2006.01)
  *H04W 16/28*  (2009.01)
  *H04W 76/11*  (2018.01)
  *H04W 76/28*  (2018.01)

(52) U.S. Cl.
  CPC .......... *H04W 64/006* (2013.01); *H04W 76/11* (2018.02); *H04W 76/28* (2018.02)

(56) References Cited

U.S. PATENT DOCUMENTS

| | | | |
|---|---|---|---|
| 2012/0129540 A1 | 5/2012 | Hakola et al. | |
| 2012/0243513 A1* | 9/2012 | Fujishima | H04W 72/085 370/336 |
| 2013/0022012 A1 | 1/2013 | Lee et al. | |
| 2013/0083753 A1 | 4/2013 | Lee et al. | |
| 2014/0192740 A1 | 7/2014 | Ekpenyong et al. | |
| 2015/0003394 A1* | 1/2015 | Ono | H04W 52/242 370/329 |

OTHER PUBLICATIONS

"LTE Quick Reference", ShareTechnote, Retrieved on Sep. 20, 2019.

Yunye Jin, et al., "Indoor Localization with Channel Impulse Response Based Fingerprint and Nonparametric Regression", IEEE Transactions on Wireless Communications, vol. 9, Issue 3, p. 1120-1127, Mar. 2010.

Joerg Eberspaecher, et al., "Entscheidungsalgorithmus für den Handoverzeitpunkt", GSM Global System for Mobile Communication, 3rd edition, B.G. Teubner Stuttgart, DE, (2001), pp. 252-259, ISBN 978-3-519-26192-6, XP055391146.

Wieruch, D., et al., "Wireless Factory Automation: Radio Channel Evolution in Repeated Manufacturing Processes", ITG Workshop on Smart Antennas (WSA), Munich, Mar. 2016, 4 pages., Mar. 2016.

Zou, Y., et al., "Digital Compensation of I/Q Imbalance Effects in Space-Time Coded Transmit Diversity Systems", IEEE Transactions on Signal Processing, vol. 56, Issue 6, p. 2496-2508, Jun. 2008., Jun. 2008.

* cited by examiner

CELLULAR COMMUNICATION NETWORK USING A USER EQUIPMENT IDENTIFIER

CROSS-REFERENCE TO RELATED APPLICATIONS

This application is a continuation of copending International Application No. PCT/EP2018/053061, filed Feb. 7, 2018, which is incorporated herein by reference in its entirety, and additionally claims priority from European Application No. 17155201.1, filed Feb. 8, 2017, which is also incorporated herein by reference in its entirety.

BACKGROUND OF THE INVENTION

The present invention concerns the field of wireless communication systems, such as a mobile communication network. Embodiments of the present invention relate to the access control of network slices implemented in a wireless communication system.

In particular, the present invention concerns a cellular communication network, a base station for a cellular communication network, a method, and a non-transitory computer readable medium for performing said method, each having the features of the appended claims.

In current mobile networks, devices that transmit a message are typically identified by the time/frequency resources they use and which were previously assigned by the base station, or by a source-identifier that is part of the message.

In particular, so-called Internet-of-Things (IoT) networks are expected to have a very high density of devices. Thus, relatively long identifiers will be needed to address each device and/or each radio bearer that a device opens for a certain service. This increases the number of bits to be transmitted, e.g. signaling for UE authentication to the network, and therefore also the power consumption.

In modern LTE (Long Term Evolution) mobile networks, the Cell Radio Network Temporary Identifier (C-RNTI) currently identifies a user equipment (UE) having a Radio Resource Control (RRC) connection within a cell and scheduling is dedicated to a particular UE. The C-RNTI is a bit string of size 16 [1, p.412] and its value can range from 1 to 65523, i.e. from 0x0001 to 0xFFF3. The base station, which is also called eNodeB or abbreviated eNB, assigns different C-RNTI values to different UEs but said C-RNTI value is unique only within one cell. C-RNTI is used for the user-specific decoding of signaling/control information on physical channels e.g. by scrambling the CRC with the C-RNTI [2].

However, C-RNTI is not used for the uplink transmission, since resource assignment is signaled by the eNB. Thus, the eNB is aware on which uplink resources the corresponding UEs are scheduled. Nevertheless, in case of NB-10T (Narrow Band Internet-of-Things), eMTC (enhanced Machine Type Communication) and mMTC (massive Machine Type Communication), it might be not beneficial to assign exclusive uplink transmission resources to a single UE.

Thus, it is an object of the present invention to enhance identification of one or more user equipments within a cell served by a base station of a cellular communication network, wherein said enhanced identification is simple and energy efficient.

SUMMARY

An embodiment may have a cellular communication network having a base station serving a radio cell and at least one user equipment located within said radio cell, wherein the base station is configured to receive a radio signal from the user equipment and to determine at least one signal property of said received radio signal, wherein the base station is further configured to assign a user equipment identifier to said user equipment based on the a least one determined signal property.

Another embodiment may have a base station for a cellular communication network, wherein the base station is configured to receive a radio signal from a user equipment that is located within a cell served by said base station, wherein the base station is further configured to determine at least one signal property of said received radio signal, and wherein the base station is configured to assign a user equipment identifier to said user equipment based on the determined signal property.

According to another embodiment, a method may have the steps of: receiving a radio signal from a user equipment that is located within a radio cell served by a base station of a cellular communication network, determining at least one signal property of said received radio signal, and assigning a user equipment identifier to said user equipment based on the at least one determined signal property.

Still another embodiment may have a non-transitory digital storage medium having stored thereon a computer program product for performing a method having the steps of: receiving a radio signal from a user equipment that is located within a radio cell served by a base station of a cellular communication network, determining at least one signal property of said received radio signal, and assigning a user equipment identifier to said user equipment based on the at least one determined signal property, when said computer program is run by a computer.

Another embodiment may have a cellular communication network having a base station serving a radio cell and at least one user equipment located within said radio cell, wherein the user equipment is configured to encrypt a message using a user equipment specific encryption key and to transmit said encrypted message by means of a radio signal, wherein the base station is configured to receive said radio signal from the user equipment and to determine at least one signal property of said received radio signal, wherein the base station is further configured to decrypt the encrypted message using a decryption key, wherein the decryption key is selected based on the at least one determined signal property.

Another embodiment may have a base station for a cellular communication network, wherein the base station is configured to receive a radio signal transmitted by a user equipment that is located within a cell served by said base station, the radio signal carrying a message that is encrypted with a user equipment specific encryption key, wherein the base station is configured to determine at least one signal property of said received radio signal, and wherein the base station is further configured to decrypt the encrypted message using a decryption key, wherein the decryption key is selected based on the at least one determined signal property.

According to another embodiment, a method may have the steps of: receiving a radio signal from a user equipment that is located within a cell served by a base station of a cellular communication network, the radio signal carrying a message that is encrypted with a user equipment specific encryption key, determining at least one signal property of said received radio signal, and decrypting the encrypted message using a decryption key, wherein the decryption key is selected based on the at least one determined signal property.

Still another embodiment may have a non-transitory digital storage medium having stored thereon a computer program product for performing a method having the steps of: receiving a radio signal from a user equipment that is located within a cell served by a base station of a cellular communication network, the radio signal carrying a message that is encrypted with a user equipment specific encryption key, determining at least one signal property of said received radio signal, and decrypting the encrypted message using a decryption key, wherein the decryption key is selected based on the at least one determined signal property, when said computer program is run by a computer.

A first aspect of the present invention concerns a cellular communication network comprising a base station serving a radio cell and at least one user equipment located within said radio cell, wherein the base station is configured to receive a radio signal from the user equipment and to determine at least one signal property of said received radio signal, wherein the base station is further configured to assign a user equipment identifier to said user equipment based on the a least one determined signal property.

In other words, the base station serves a certain radio cell and a user equipment may access said radio cell. A radio cell served by one base station may be accessed by a plurality of user equipments. In order to manage the communication of the user equipments within the radio cell, the base station assigns an identifier to each of the user equipments. Therefore, a user equipment entering the radio cell may send an access request to the base station and the base station may assign an identifier to said user equipment. In common cellular networks, the base station assigns an unique identifier to each of the user equipments within said radio cell. The assignment may be executed randomly. In common LTE networks, for instance, the base station assigns an unique RNTI (Radio Network Temporary Identifier) to each of the user equipments. This RNTI is a bit string of size 16, i.e. the RNTI uses 16 bit. Due to this large number of bits that have to be transmitted, the power consumption of the participating devices is increased.

However, the present invention suggests assigning a user equipment identifier to a user equipment not randomly but based on at least one signal property of the UE signal. That is, each user equipment may have its individual radio signal properties which is also called a footprint of the user equipment. Such footprints may be advantageous in rather stationary IoT-networks, for instance. The base station of the present invention is configured to assign an identifier, i.e. a user equipment identifier, to a user equipment based on at least one signal property of the radio signal transmitted by the user equipment, e.g. based on the user equipment's footprint. Upon receipt of the user equipment's radio signal by the base station, the base station analyzes the radio signal, e.g. by determining at least one signal property. Based thereon, the base station assigns a user equipment identifier to that one user equipment.

In case of two or more user equipments within the radio cell, the present invention may allow the base station to assign two different user equipment identifiers, i.e. a first user equipment identifier associated with the first user equipment and a different second user equipment identifier associated with the second user equipment. However, the present invention also allows the base station to assign the same user equipment identifier to both the first and the second user equipment. Since the base station knows the individual footprint of each user equipment, the base station is enabled to differentiate the two user equipments by means of their individual footprints even though they might have been assigned the same identifier. Accordingly, the present invention allows for a re-use of identifiers, i.e. the base station may assign the same identifier to two different user equipments. Thus, the bit size of user equipment identifiers can be drastically reduced compared to the known technology using 16 bit C-RNTIs for example. Since the number of bits to be transmitted by a user equipment is reduced, the power consumption of the user equipment is reduced accordingly.

The above mentioned at least one signal property may be a physical signal property of the user equipment's radio signal. A physical signal property may comprise at least one of a channel impulse response, a power delay profile, a signal strength, an Angle of Arrival, data regarding the position of the user equipment, a MIMO (Multiple Input Multiple Output) channel statistic, an IQ (In-Phase/Quadrature) imbalance in MIMO, a variance or bias of the carrier frequency of the user equipment, or a user equipment transmit filter shape. Further physical signal properties may also be used.

According to some examples, the base station may also be configured to determine the at least one signal property from the transmitted payload, the payload comprising at least one of a destination information, a length information and a content information. Other payload information may also be used.

A second aspect of the present invention concerns a base station for a cellular communication network, wherein the base station is configured to receive a radio signal from a user equipment that is located within a cell served by said base station, wherein the base station is further configured to determine at least one signal property of said received radio signal, and wherein the base station is configured to assign a user equipment identifier to said user equipment based on the determined signal property.

A third aspect of the present invention concerns a method comprising receiving a radio signal from a user equipment that is located within a radio cell served by a base station of a cellular communication network, determining at least one signal property of said received radio signal, and assigning a user equipment identifier to said user equipment based on the at least one determined signal property.

A fourth aspect of the present invention concerns a non-transitory computer program product comprising a computer readable medium storing instructions which, when executed on a computer, perform the above mentioned method.

A fifth aspect of the present invention concerns a cellular communication network comprising a base station serving a radio cell and at least one user equipment located within said radio cell, wherein the user equipment is configured to encrypt a message using a user equipment specific encryption key and to transmit said encrypted message by means of a radio signal, wherein the base station is configured to receive said radio signal from the user equipment and to determine at least one signal property of said received radio signal, wherein the base station is further configured to decrypt the encrypted message using a decryption key, wherein the decryption key is selected based on the at least one determined signal property.

That is, the base station may receive an encrypted message from a user equipment, wherein the base station needs to find the correct decryption key from a predetermined set of decryption keys. The number of decryption keys may be very high. In common decryption algorithms, the base station has to try each single decryption key from the predetermined set of decryption keys until the correct decryption key is found. This may entail a high amount of computations. The present invention allows the base station to find the correct decryption key considerably faster. Since the base station determines the at least one signal property of the received encrypted message, the base station can do a pre-selection of potential user equipment candidates. That is, the base station may compare the signal property of a received signal with a previously determined signal. The decryption key that is associated with that one user equipment with the highest correlation may be tested first for decrypting the encrypted message. If not successful, that one user equipment with the next highest correlation may be tested next, and so forth. Accordingly, the base station of the present invention may select the correct decryption key based on the determined at least one signal property. Thus, the base station of the present invention may find the correct decryption key much quicker than commonly used algorithms.

A sixth aspect of the present invention concerns a base station for a cellular communication network, wherein the base station is configured to receive a radio signal transmitted by a user equipment that is located within a cell served by said base station, the radio signal carrying a message that is encrypted with a user equipment specific encryption key, wherein the base station is configured to determine at least one signal property of said received radio signal, and wherein the base station is further configured to decrypt the encrypted message using a decryption key, wherein the decryption key is selected based on the at least one determined signal property.

A seventh aspect of the present invention concerns a method comprising receiving a radio signal from a user equipment that is located within a cell served by a base station of a cellular communication network, the radio signal carrying a message that is encrypted with a user equipment specific encryption key, determining at least one signal property of said received radio signal, and decrypting the encrypted message using a decryption key, wherein the decryption key is selected based on the at least one determined signal property.

An eighth aspect of the present invention concerns a non-transitory computer program product comprising a computer readable medium storing instructions which, when executed on a computer, perform the above mentioned method.

BRIEF DESCRIPTION OF THE DRAWINGS

Embodiments and examples of the present invention are now described in further detail with reference to the accompanying drawings, in which.

DETAILED DESCRIPTION OF THE INVENTION

In the following, embodiments of the present invention are described in further detail with reference to the enclosed drawings in which elements having the same or similar function are referenced by the same reference signs.

Furthermore, all explanations, statements and examples that are described with reference to a device (e.g. cellular communication network, base station, user equipment) are also valid for corresponding methods described herein.

Figure 1A:
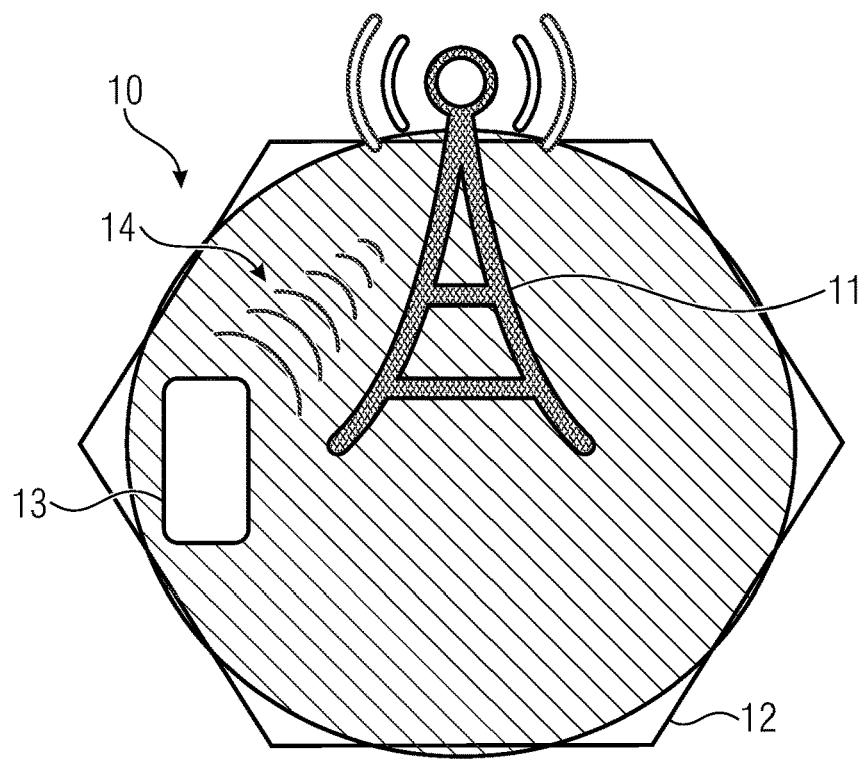
FIG. 1A shows a cellular communication network according to an example.
Figure 1B:
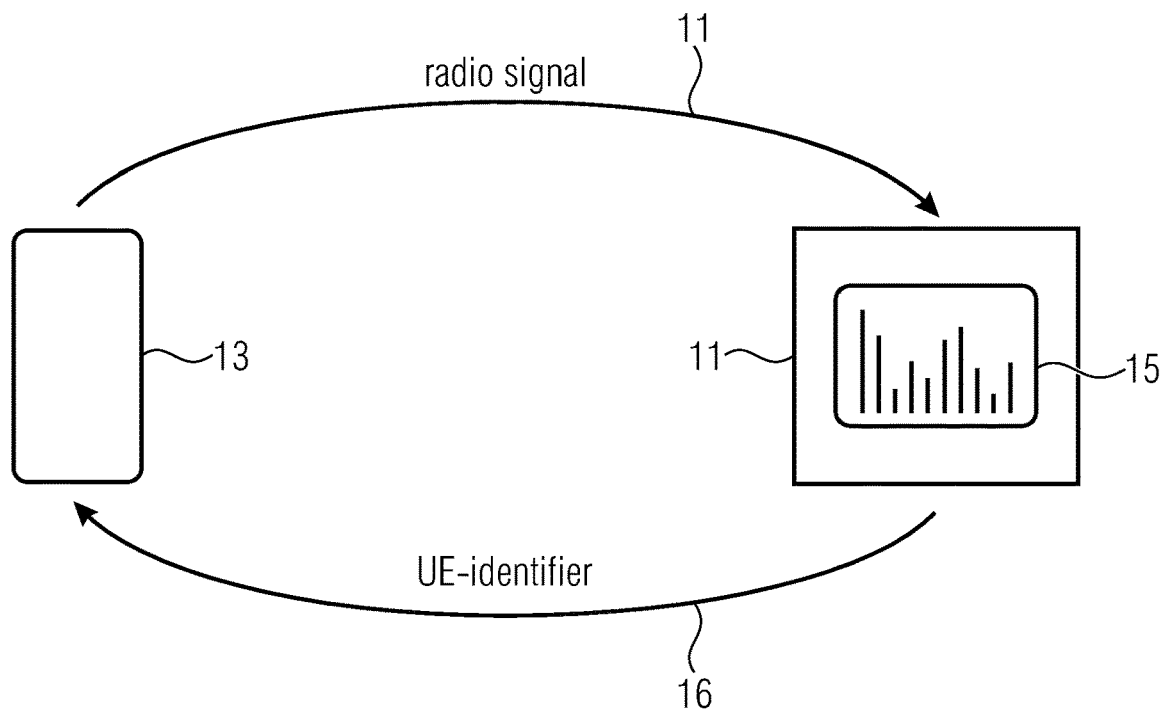
FIG. 1B shows a principle scheme of assigning a user equipment identifier according to an example.

FIGS. 1A and 1B show a cellular communication network 10 according to the present invention. The cellular communication network 10 comprises a base station 11 serving a radio cell 12 and at least one user equipment 13 located within said radio cell 12.

The user equipment 13 may be any kind of mobile device, such as a mobile phone, for instance, or a stationary device, such as a thermostat of a heating which are increasingly used in so-called smart homes, for instance. The present invention may be advantageously used in IoT networks (Internet-of-Things) in which user equipments 13 are rather stationary. However, the present invention may also be used in common networks with moving user equipments 13, such as in mobile phone networks using LTE, 5G or the like.

The base station 11 is configured to receive a radio signal 14 from the user equipment 13 and to determine at least one signal property 15 of said received radio signal 14.

The base station 11 is further configured to assign a user equipment identifier 16 to said user equipment 13 based on the a least one determined signal property 15.

The user equipment identifier 16, in the following also referred to as a UE-identifier 16, may be a RNTI (Radio Network Temporary Identifier), for example SI-RNTI, P-RNTI, C-RNTI, Temporary C-RNTI, SPS-CRNTI, TPC-PUCCH-RNTI, TPC-PUSCH-RNTI, RA-RNTI, and M-RNTI, which abbreviations can be found in [1].

According to an example, the at least one signal property 15 may be a physical signal property of the radio signal 14 transmitted by the user equipment 13. Said physical signal property may comprise at least one of a channel impulse response, a power delay profile, a signal strength, an Angle of Arrival, data regarding the position of the user equipment, a MIMO channel statistic, an IQ imbalance in MIMO, a variance or bias of the carrier frequency of the user equipment, or a user equipment transmit filter shape.

Additionally or alternatively, the base station 11 may be configured to determine the at least one signal property 15 from the transmitted payload, the payload comprising at least one of a destination information, a length information and a content information.

Each user equipment 13 may transmit a radio signal 14 having at least one signal property 15 which is characteristic for that one user equipment 13. The determined at least one signal property 15 of a radio signal 14 transmitted by a user equipment 13 may identify that one user equipment 13 from which a received radio signal 14 originated. Since the signal properties 15 of a user equipment 13 may be individual and characteristic, the at least one determined signal property 15 may also be referred to as a fingerprint of the user equipment 13.

The base station 11 may be configured to determine a plurality of signal properties 15 of a received radio signal 14 transmitted by a user equipment 13. The more signal properties 15 the base station 11 may determine from said radio signal 14, the more detailed the determination of the fingerprint of said user equipment 13 may be.

The base station 11 may be configured to store the at least one determined signal property 15 of the radio signal 14 of the user equipment 13 together with the assigned user equipment identifier 16 of said user equipment 13 in a database.

Furthermore, the database may be a cloud-based database, such that the base station 11 may be enabled to store the at least one determined signal property 15 of a user equipment 13 together with its assigned UE-identifier 16 centrally on a server. In this case, information on UE-specific features (e.g. the at least one determined signal property 15) can be exchanged with neighboring base stations which may also collect fingerprints.

According to an example, the base station 11 may be configured to determine the at least one signal property 15 of said received radio signal 14 of the user equipment 13 during a RACH (Random Access Channel) procedure of said user equipment 13.

Figure 2A:
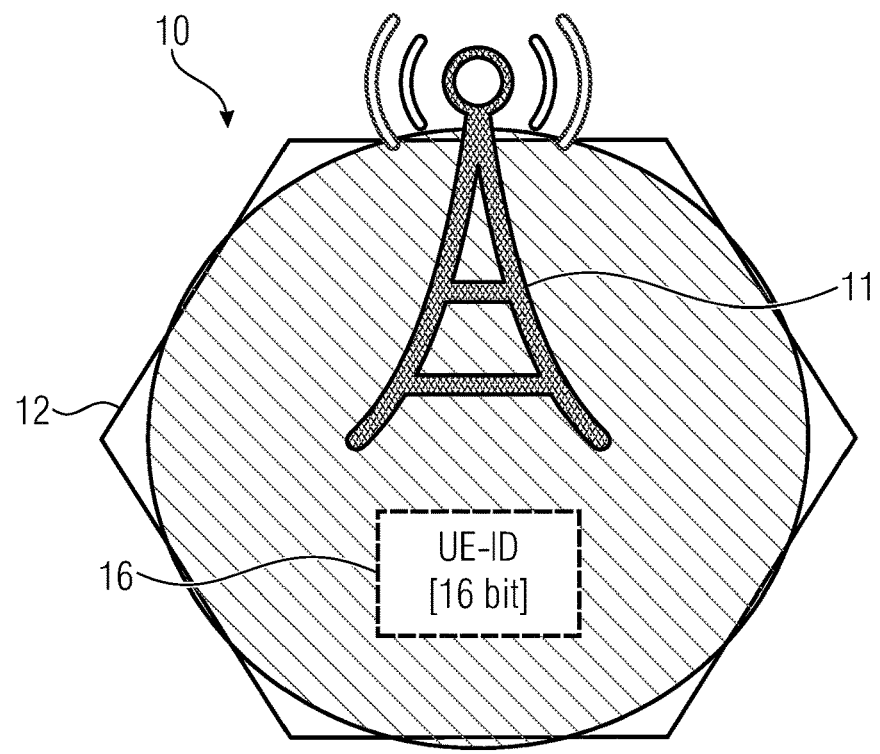
FIG. 2A shows a radio cell served by a base station according to an example.
Figure 2B:
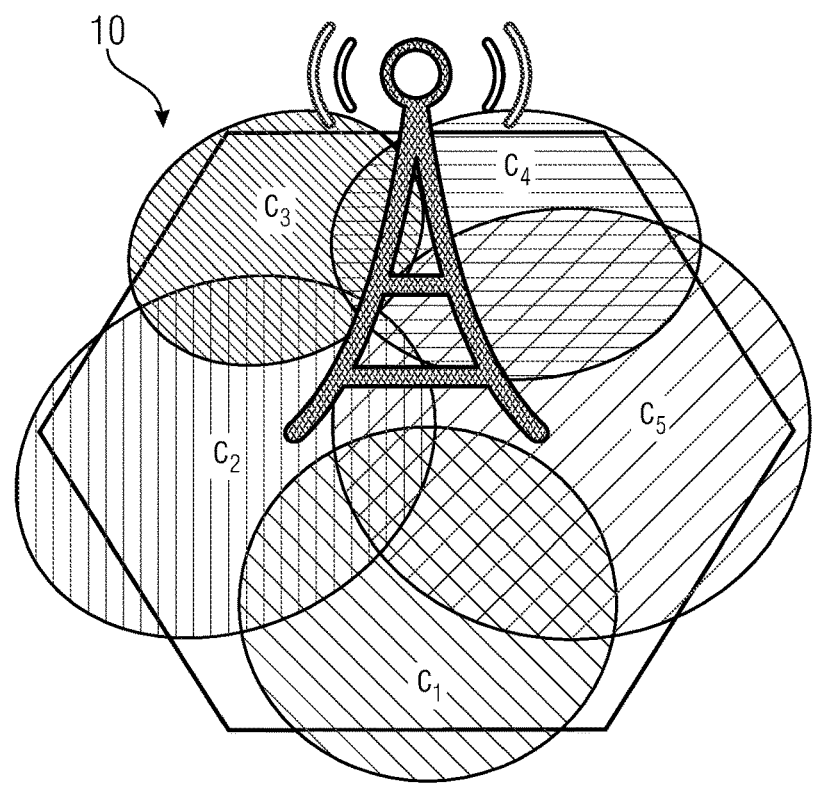
FIG. 2B shows a base station serving a radio cell having different groups of user equipment identifiers according to an example.

FIGS. 2A and 2B exemplarily show an advantage that can be achieved with the present invention.

As can be seen in FIG. 2A, the base station 11 may serve a radio cell 12. The radio cell 12 contains a particular amount of exclusively reserved user equipment identifiers (UE-identifiers or UE-IDs). For example, the base station 11 may have exclusively reserved 16-bit such that 65.536 exclusive UE-identifiers may be assigned to user equipments located within this radio cell 12.

As can be seen in FIG. 2B, in the cellular network 10 of the present invention, the base station 11 may divide its served radio cell 12 into two or more subsets $c_1$ to $c_5$ of UE-Identifiers. These subsets $c_1$ to $c_5$ will also be referred to as groups of UE-identifiers. Accordingly, the base station 11 may comprise at least a first group $c_1$ of user equipment identifiers and a second group $c_2$ of user equipment identifiers.

According to an example, a first group $c_1$ may have the same size (e.g. in bits) than a second group $c_2$. However, it may also be possible that a first group $c_1$ may have a different size (e.g. in bits) than a second group $c_2$.

For example, the first group $c_1$ may have a size of 5 bits. Accordingly, the base station 11 may assign 32 exclusive UE-identifiers within said first group $c_1$. The second group $c_2$ may have a size of 6 bits. Accordingly, the base station 11 may assign 64 exclusive UE-identifiers within said second group $c_2$.

The first group $c_1$ may contain a first set of UE-identifiers, for example UE-identifiers '0' to '31'. The second group $c_2$ may contain a second set of UE-identifiers, for example UE-identifiers from '32' to '96'.

However, one advantage of the invention is the possibility to re-use UE-identifiers. As an example, the first group $c_1$ may contain a first set of UE-identifiers, for example UE-identifiers '0' to '31' and the second group $c_2$ may contain UE-identifiers from '0' to '64'. Thus, at least the UE-Identifiers '0' to '31' are contained in both the first group $c_1$ and the second group $c_2$.

According to an example, at least one of the user equipment identifiers of the first group $c_1$ is identical to at least one of the user equipment identifiers of the second group $c_2$, in particular if the groups $c_1$ to $c_5$ may have different sizes (e.g. in bits), as explained above.

According to a further example, all of the user equipment identifiers of the first group $c_1$ are identical to the user equipment identifiers of the second group $c_2$, in particular if the groups $c_1$ to $c_5$ may have the same size (e.g. in bits).

Even though identical UE-identifiers may be re-used, the base station 11 is nevertheless configured to identify the respective user equipment since the group itself is known to the base station 11. That is, the base 11 station knows (e.g. by means of storage in a database) which of the UE-identifiers of which group $c_1$ to $c_5$ belongs to a certain user equipment. For this purpose, the base station 11 may store an UE-identifier together with its group to which said UE-identifier belongs. As an example, a first user equipment may be assigned UE-identifier '1' from group $c_1$, while a second user equipment may also be assigned UE-identifier '1' but from group $c_2$.

Therefore, the present invention may provide groups $c_1$ to $c_5$ of UE-identifiers which can be drastically reduced in size (e.g. in bits) compared to commonly known UE-identifiers, such as 16-bit RNTI-identifiers, for example.

However, assumed that more than 65.536 user equipments may be located inside one radio cell 12, the bit size of a common RNTI (16 bit) will have to be increased accordingly. The present invention instead may still be able to further use the 16-bit RNTIs by providing different groups $c_1$ to $c_5$ of RNTIs, wherein each group may contain a 16-bit RNTI.

Still referring to FIG. 2B, the depicted example shows a cellular network 10 comprising five groups $c_1$ to $c_5$ of different UE-identifiers. As mentioned above, the base station 11 may determine at least one signal property 15 of a received radio signal 14. Depending on the determined signal property 15, the base station 11 may group the respective user equipment 13 into one of the groups $c_1$ to $c_5$ by assigning a UE-identifier of the respective group $c_1$ to $c_5$ to the user equipment 13.

For example, the base station 11 may detect a first user equipment $13_1$ and identifies it (by means of determining its at least one signal property 15) as being a smart watch. Accordingly, the base station 11 groups the smart watch UE $13_1$ into group $c_1$ (which may be a smart watch group) and assigns a UE-identifier $16_{1,4}$ of said first group $c_1$ to the user equipment 13 (smart watch).

If the base station 11 would instead identify the first user equipment $13_1$ as being a thermostat (by means of determining its at least one signal property 15), the base station 11 would group this user equipment $13_1$ into second group $c_2$ (which may be a thermostat group) and assigns a UE-identifier $16_{1,4}$ of said second group $c_2$ to the user equipment $13_1$ (thermostat).

Thus, according to an example, the base station 11 may be configured to selectively assign either a user equipment identifier 16 of the first group $c_1$ or a user equipment identifier of the second group $c_2$ to a user equipment 13 based on the at least one determined signal property of said user equipment 13.

According to a further example, the base station 11 may detect a second user equipment $13_2$ and may identify it (by means of determining its at least one signal property 15) as also being a smart watch. Accordingly, the base station 11 groups this second smart watch UE 13$_2$ also into group $c_1$ (which may be a smart watch group) and assigns a UE-identifier 1618 of said first group $c_1$ to the second user equipment 13$_2$ (smart watch).

However, if the base station 1 may identify the second user equipment 13$_2$ as being a thermostat, for example, the base station 11 may group said second user equipment 13$_2$ (thermostat) into group $c_2$ (which may be a thermostat group) and assigns a UE-identifier 16$_{1A}$ of said second group $c_2$ to the second user equipment 13$_2$ (thermostat).

As can be seen in the above mentioned example, the same UE-identifier 16$_{1A}$ may be assigned both to a smart watch 13$_1$ and to a thermostat 13$_2$. However, since the UE-identifier 16$_{1A}$ each time belongs to a different group $c_1$ or $c_2$, both user equipments 13$_1$, 13$_2$ can still be distinguished from each other.

By way of a more abstract example, the base station 11 may correlate the determined signal property 15$_1$ of a first user equipment 13$_1$ (e.g. smart watch) with the determined signal property 15$_2$ of a second user equipment 13$_2$ (e.g. thermostat).

If the base station 11 determines a high correlation between both signal properties 15$_1$, 15$_2$, the base station 11 groups both user equipments 13$_1$, 13$_2$ into the same group $c_1$. If the base station 11, however, determines a rather low correlation between both signal properties 15$_1$, 15$_2$, the base station 11 groups the first user equipment 13$_1$ into a first group $c_1$ and groups the second user equipment 13$_2$ into a second group $c_2$.

Thus, according to an example, the base station 11 is configured to receive a first radio signal 14$_1$ from a first user equipment 13$_1$ and a second radio signal 14$_2$ from a second user equipment 13$_2$ and to determine an amount of correlation between the first and second radio signals 14$_1$, 14$_2$, wherein the base station 11 is configured, based on the determined amount of correlation, to either assign a user equipment identifier 16 of the first group $c_1$ to the first user equipment 13$_1$ and a user equipment identifier of the second group $c_2$ to the second user equipment 13$_2$, or to assign different user equipment identifiers of the first group $c_1$ to each of the first and the second user equipment 13$_1$, 13$_2$.

Instead of grouping user equipments 13 into groups of device specific properties (smart watch, thermostat, TV, etc.), as explained by way of the non-limiting example above, it may also be possible to define other kind of groups, for example location specific groups, wherein each user equipment 13 located in the south of the base station 11 will be grouped into group $c_1$ (south) while each user equipment 13 located in the north of the base station 11 will be grouped into group $c_4$ (north). More generally speaking, the kind of groups may depend on the respective determined signal properties which are of interest.

As mentioned above, the base station 11 may be configured to create a user equipment specific fingerprint by storing both the at least one determined signal property 15 and the respectively assigned UE-identifier 16 into a database.

According to an example, the base station 11 may be configured to store the at least one determined signal property 15 of the received radio signal 14 of the user equipment 13 into a specific user equipment feature vector a.

One approach (not excluding other options) for collecting or determining signal properties 15 could be the construction of a feature vector of the following type:

$$a=[h^T, f_{\textit{off}}, \sigma_{f_{\textit{off}}}, \Theta, \Phi]^T$$

as described, for example, in reference [4], where the samples of the CIR (Channel Impulse Response) are collected in vector h which comes together with the collection of other features in vector a, possibly normalized by the variance of the respective feature.

For example, each of the aforementioned groups $c_1$ to $c_5$ of UE-identifiers, i.e. each group $c\_i$, may be characterized by a single feature vector $a\_i$, which might be an average of the feature vectors of all UEs 13 already included in that specific group $c\_i$. A new UE 13, so far unknown to the base station 11, transmits a random access burst, then the features 15 are calculated/estimated and vector $a\_new$ is established. Some distance metric of $a\_new$ to all vectors $a\_i$ is minimized, e.g.

$$\min_i \|a_{new} - a_i\|$$

where $\|.\|$ denotes an arbitrary norm (NOTE: alternatively, each vector may be mapped to a different metric space and distances may be computed in this mapped feature vector). After solving the above optimization problem, the UE 13 may be assigned to group i if not already full. If an UE 13 with same RNTI 16 is already in the same group, a possible solution is to have them run on different DRX cycles or differentiate the control channel in frequency.

Thus, according to an example, the base station 11 may comprise a first group $c_1$ of user equipment identifiers 16 and a second group $c_2$ of user equipment identifiers 16, wherein the base station 11 may be configured to create a first group feature vector $a_1$ for the first group $c_1$ of user equipment identifiers 16 and a second group feature vector $a_2$ for the second group $c_2$ of user equipment identifiers 16, wherein each of the group feature vectors $a_1$, $a_2$ comprises the average of all of the specific user equipment feature vectors $h_i$ of those user equipments 13 that are already contained in the respective group $c_1$, $c_2$ of user equipment identifiers 16.

As mentioned above, the base station 11 may execute a correlation between the signal properties 15 of different user equipments 13 in order to determine into which group $c_i$ of user equipment identifiers 16 a new user equipment 13 may best fit. Such a correlation may also be executed with the aforementioned feature vectors $h_i$, $a_i$ for the same purpose.

According to an example, the base station 11 may be configured to compare the specific user equipment feature vector $a_{new}$ of the user equipment 13 with at least the first group feature vector $a_1$ of the first group $c_1$ of user equipment identifiers 16, and wherein the base station 11 may further be configured to either assign a user equipment identifier 16 of the first group $c_1$ of user equipment identifiers to the user equipment 13 if a difference between the user equipment feature vector $a_{new}$ and the first group feature vector $a_1$ is below a predetermined threshold value, or to assign a user equipment identifier 16 of the second group $c_2$ of user equipment identifiers to the user equipment 13 if a difference between the user equipment feature vector $a_{new}$ and the first group feature vector $a_1$ exceeds a predetermined threshold value.

As mentioned above, the same UE-identifier 16$_{1A}$ may be assigned both to a first user equipment (UE) 13$_1$ and to a second UE 13$_2$. However, as long as the UE-identifier 16$_{1A}$ each time belongs to a different group $c_1$ or $c_2$, both user equipments 13$_1$, 13$_2$ can still be distinguished from each other.

However, it may happen that two UEs $13_1$, $13_2$ having the same UE-identifier 16 are contained in the same group $c_i$ of identifiers. The present invention may also deal with this problem.

According to an example, if a first user equipment $13_1$ and a second user equipment $13_2$ are assigned the same user equipment identifier $16_i$ within the same group $c_i$ of user equipment identifiers, the base station 11 may be configured to have the first and second user equipments $13_1$, $13_2$ run on different discontinuous reception (DRX) cycles or to differentiate the control channel in frequency.

Additionally or alternatively to the examples above, the cellular communication network 10 of the present invention may also exploit spatial beamforming, as will be explained below with reference to FIG. 3.

Figure 3:
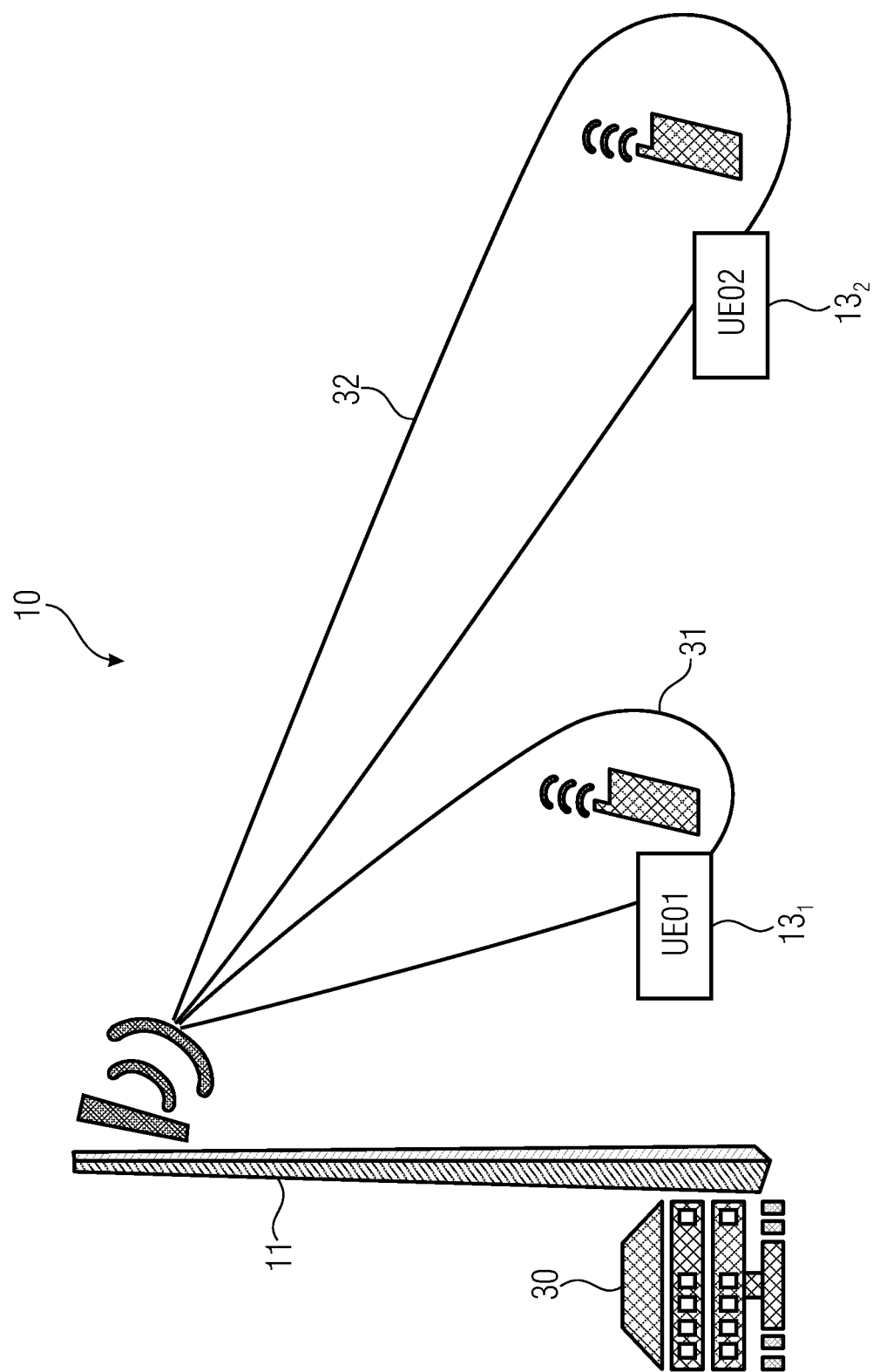
FIG. 3 shows an example of assigning a user equipment identifier to an user equipment in combination with spatial beamforming according to an example.

FIG. 3 shows an example of a cellular communication network 10 comprising a base station 11, a first user equipment $13_1$ and a second user equipment $13_2$. The base station 11 is connected to a database 30.

As can be seen, the base station 11 uses spatial beamforming, wherein a first beam 31 is directed to the position of the first UE $13_1$ while a second beam 32 is directed to the second UE $13_2$.

The first beam 31 may be a receive beam, i.e. a beam originating from the first UE $13_1$ and being received by the base station 11, or a transmit beam, i.e. a beam being transmitted from the base station 11 to the first UE $13_1$.

The second beam 32 may be a receive beam, i.e. a beam originating from the second UE $13_2$ and being received by the base station 11, or a transmit beam, i.e. a beam being transmitted from the base station 11 to the second UE $13_2$.

The receive beam 31 of the first UE $13_1$ carries the radio signal $14_1$ transmitted by the first UE $13_1$. The receive beam 32 of the second UE $13_2$ carries the radio signal $14_2$ transmitted by the second UE $13_2$.

According to an example, the base station 11 may be configured to receive a receive beam 31, 32 originating from a user equipment $13_1$, $13_2$, the receive beam 31, 32 carrying the radio signal $14_1$, $14_2$, and wherein the base station 11 may further be configured to determine, as the at least one signal property $15_1$, $15_2$ of said radio signal $14_1$, $14_2$, the direction of said receive beam 31, 32 in order to estimate the position of the user equipment $13_1$, $13_2$, and to assign a user equipment identifier 16 to the user equipment $13_1$, $13_2$, the user equipment identifier 16 depending on the determined direction of the receive beam 31, 32.

In other words, the base station 11 may be configured to receive, in a receive beam 31, the radio signal 14 from the UE 13, The base station 11 may then determine at least one signal property 15. In this case, the base station 11 determines the direction of the receive beam 31, for instance, by determining an AoA (Angle of Arrival).

Thus, the base station 11 knows the position of each UE $13_1$, $13_2$ located inside its radio cell. Accordingly, the base station 11 may assign the same UE-identifier 16 to both the first UE $13_1$ and the second UE $13_2$, provided that both UEs $13_1$, $13_2$ are located at a different position. The base station 11 may store the respective UE $13_1$, $13_2$ together with its position and the (possibly identical) UE-identifier 16 in database 30. As mentioned above, the position of the respective UE $13_1$, $13_2$ may be determined by determining the at least one signal property 15, which may in this case be any position information, such as an AoA, for example.

According to an example, the base station 11 is configured to assign a user equipment identifier 16 to a first user equipment $13_1$ at a first position and to assign the same user equipment identifier 16 to a second user equipment $13_2$ at a second position, wherein the base station 11 is further configured to transmit, by means of spatial beam forming, a transmission beam 31, 32 carrying a transmission radio signal $14_1$, $14_2$ selectively to either the first user equipment or the second user equipment $13_1$, $13_2$ depending on the previously determined direction of the receive beam 31, 32.

Additionally or alternatively, the base station 11 may exploit the knowledge of the position of the respective UE $13_1$, $13_2$ in another way, i.e. without using spatial beamforming. Such an example shall be explained with reference to FIG. 4.

Figure 4:
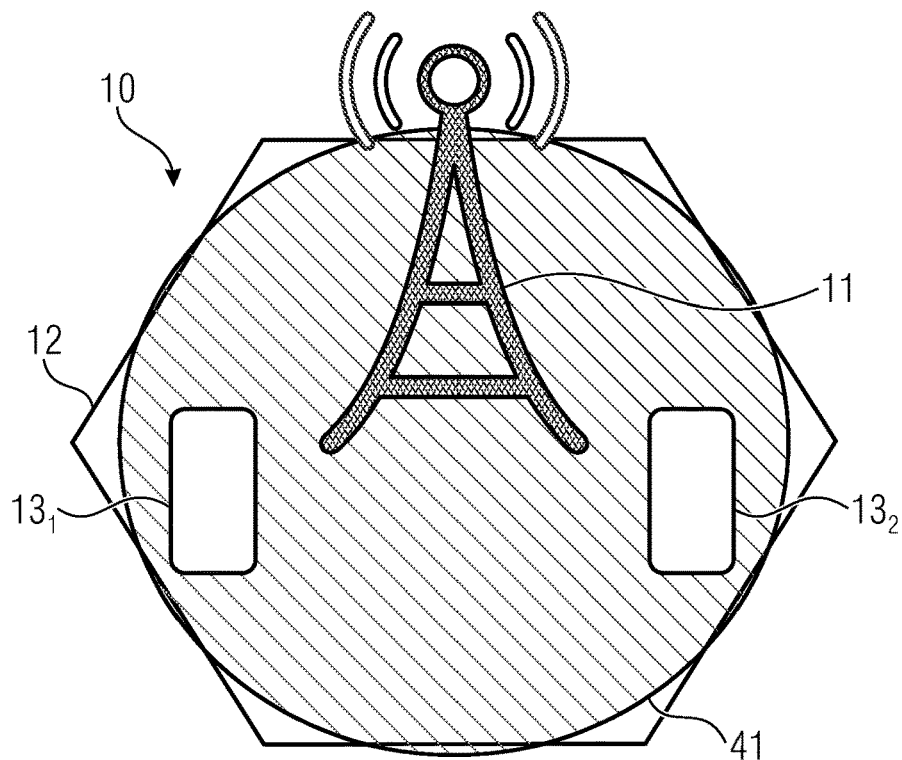
FIG. 4 shows a base station serving a radio cell in which two user equipments are located according to an example.

FIG. 4 shows two UEs $13_1$, $13_2$ located at different positions within the radio cell 12 served by the base station 11. As explained above, the base station 11 may know the position of each of the UEs $13_1$, $13_2$ by determining the at least one signal property 15. Each of the UEs $13_1$, $13_2$ may be assigned the same (or a different) UE-identifier 16 in combination with its respective position information.

In the example of FIG. 4, the base station 11 may transmit a radio signal 41 (shadowed circle) throughout its entire radio cell 12. Accordingly, both the first UE $13_1$ and the second UE $13_2$ may receive that signal. However, since the radio signal 41 may comprise the UE-identifier 16 in combination with the respective position information of the respective UE $13_1$, $13_2$ that is to be addressed by said radio signal 41, the correct UE $13_1$, $13_2$, i.e. the intended recipient of the message, receives the message.

The above example holds true for uplink and downlink communications.

According to an example, the base station 11 may be configured to assign a user equipment identifier 16 to a first user equipment $13_1$ at a first position and to assign the same user equipment identifier 16 to a second user equipment $13_2$ at a second position, wherein the base station 11 may further be configured to transmit a transmission radio signal 41 to be received by both the first and the second user equipment $13_1$, $13_2$, wherein the transmission radio signal 41 contains the user equipment identifier 16 and a position information of that one user equipment $13_1$, $13_2$ that is the intended recipient of the transmission radio signal 41.

According to the above described examples, a fingerprinting approach by spatial separation for C-RNTI, for instance, can be exploited for a random access procedure. In legacy systems a collision in the random access attempt may occur whenever two devices randomly select the same random access sequence for the same PRACH from the sequence pool.

Figure 5:
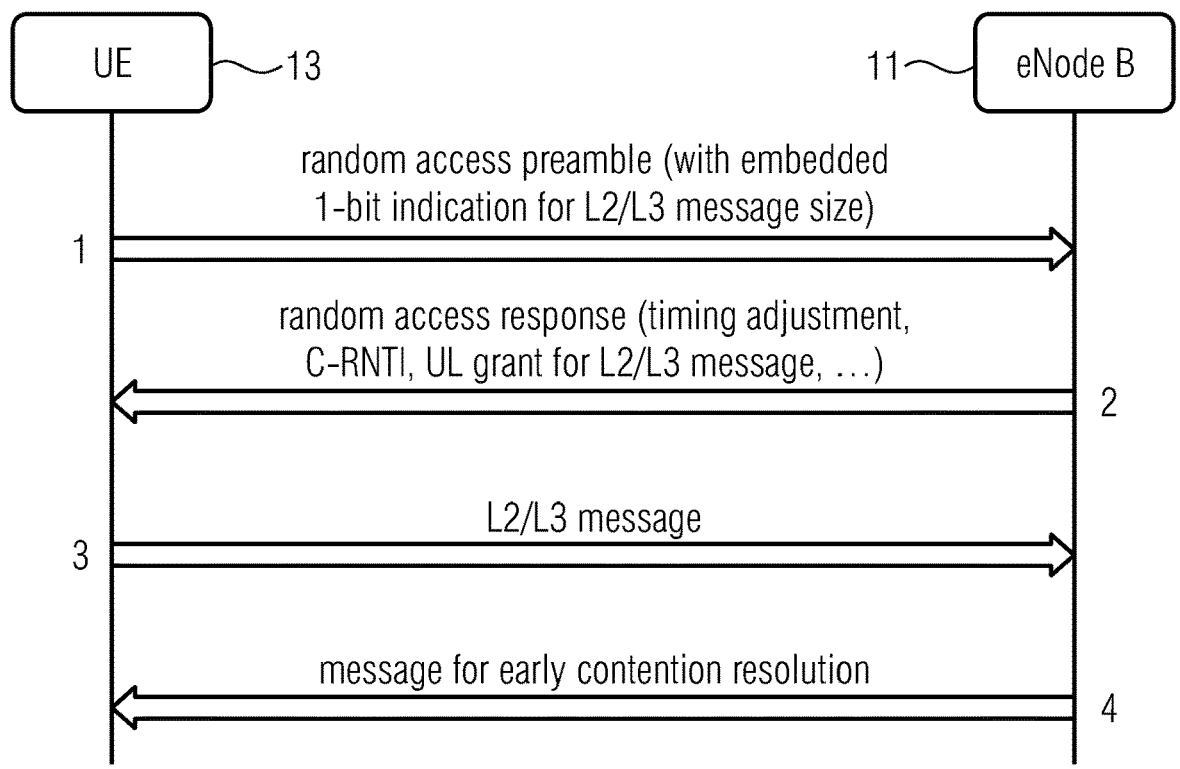
FIG. 5 is based on a Figure of reference [6] and shows a successful contention-based random access procedure according to an example.

However, if the random access preambles are separated through receive beams 31, 32 (cf. FIG. 3) a collision can be avoided. The eNB 11 can detect both random access preambles separately through both receive beams 31, 32. Consequently, the eNB 11 can initiate a random access response for both UEs, incorporating the corresponding transmission beam. FIG. 5, which is based on a Figure of reference [6], shows a successful contention-based random access procedure.

There are two options for the reported C-RNTI.
(1) For both UEs $13_1$, $13_2$ the same UE-identifier 16 (e.g. C-RNTI) is used, so that in the following the UEs $13_1$, $13_2$ are targeted by the combination of C-RNTI and spatial beamforming (cf. FIG. 3).
(2) The corresponding initial receive beam is incorporated into the UE-identifier 16 (e.g. C-RNTI). Consequently, both users $13_1$, $13_2$ are uniquely identified by the C-RNTI independently from the spatial beamforming and therefore their position.

Additionally or alternatively, in order to gain more detailed radio channel information (e.g. in terms of high channel resolution) and to exploit small variations in fingerprints, an optional feature could be to allow initial transmissions of short high-power impulses that spread over a large bandwidth in the frequency domain.

According to an example, the base station 11 is configured to receive, from the user equipment 13, short high-power impulses that spread over a large bandwidth in the frequency domain including out-of-band frequency areas, wherein the base station 11 is configured to determine the at least one signal property 15 from said short high-power impulses.

A precondition to run such a scheme is system support for short-term exploitation of out-of-band frequency areas (may be enabled in the future). Otherwise, the channel characteristics, from which the signal properties 15 are derived, can be exploited within the covered bandwidth.

Additionally or alternatively, the inventive concept may provide for enhanced message decoding by means of accelerated transmitter identification using the at least one determined signal property 15.

An eNB 11 may identify a transmitting user equipment 13 (in uplink) based on a scrambled checksum. The scrambling sequence that may be used to alter the checksum, identifies the transmitter, see FIG. 6.

In order to accelerate the search process for the correct UE-Identifier 16, the physical features, i.e. the determined at least one signal property 15, of the receive signal is/are used. That is, UE-identifiers with a higher likelihood with respect to the physical features 15 are tested first.

According to an example, the user equipment 13 may be configured to generate a message 51 comprising a checksum 52, wherein the checksum 52 is calculated by a combination with the user equipment identifier 16 of the user equipment 13, and wherein the user equipment 13 is further configured to transmit said message 51 by means of a radio signal 14.

According to a further example, the base station 11 is configured to receive the radio signal 14 containing the message 51 comprising the checksum 52, and the base station 11 may further be configured to select, based on the at least one determined signal property 15 of said received radio signal 14, the correct user equipment identifier 16 for re-calculating the checksum 52.

In other words, the base station 11 receives a radio signal 14 and determines the at least one signal property 15. Based on this signal property 15 the base station 11 knows from which group $c_i$ of UE-identifiers, and/or from which position the received radio signal 14 was transmitted. Accordingly, the base station 11 tries those UE-identifiers 16 of the UEs 13 first which may have the highest correlation with the signal properties of the received radio signal 14.

Figure 7:
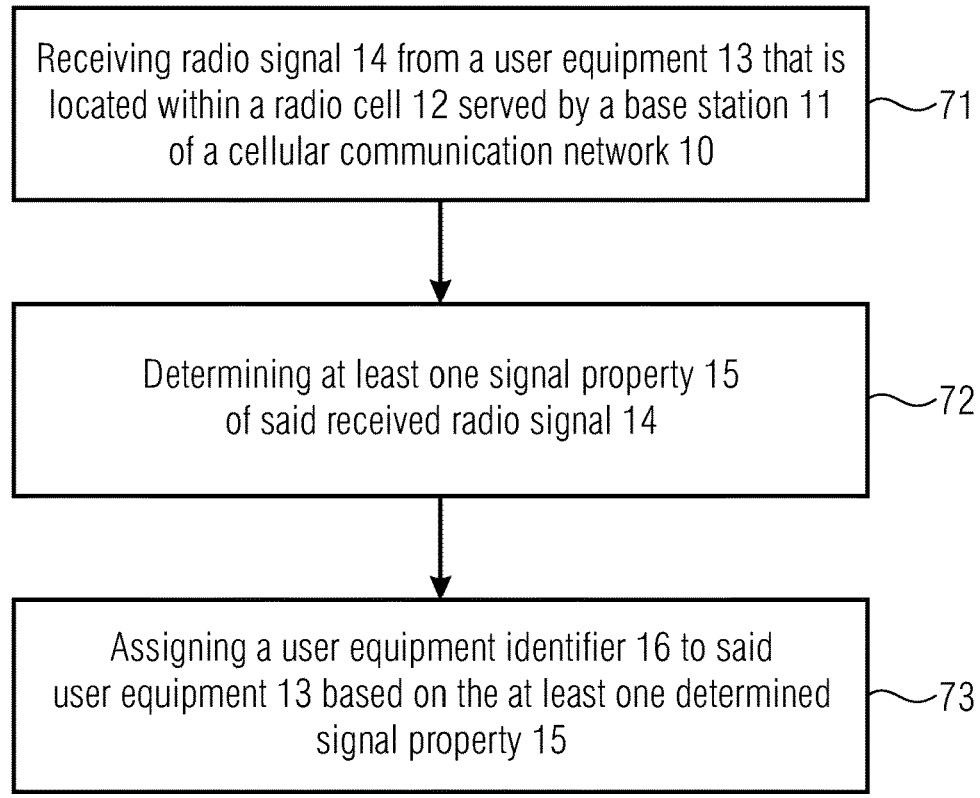
FIG. 7 shows a block diagram of an inventive method according to an example.

FIG. 7 shows a block diagram of an inventive method.

In block 71, a radio signal 14 from a user equipment 13 that is located within a radio cell 12 served by a base station 11 of a cellular communication network 10 is received.

In block 72, at least one signal property 15 of said received radio signal 14 is received.

In block 73, a user equipment identifier 16 is assigned to said user equipment 13 based on the at least one determined signal property 15.

Figure 8:
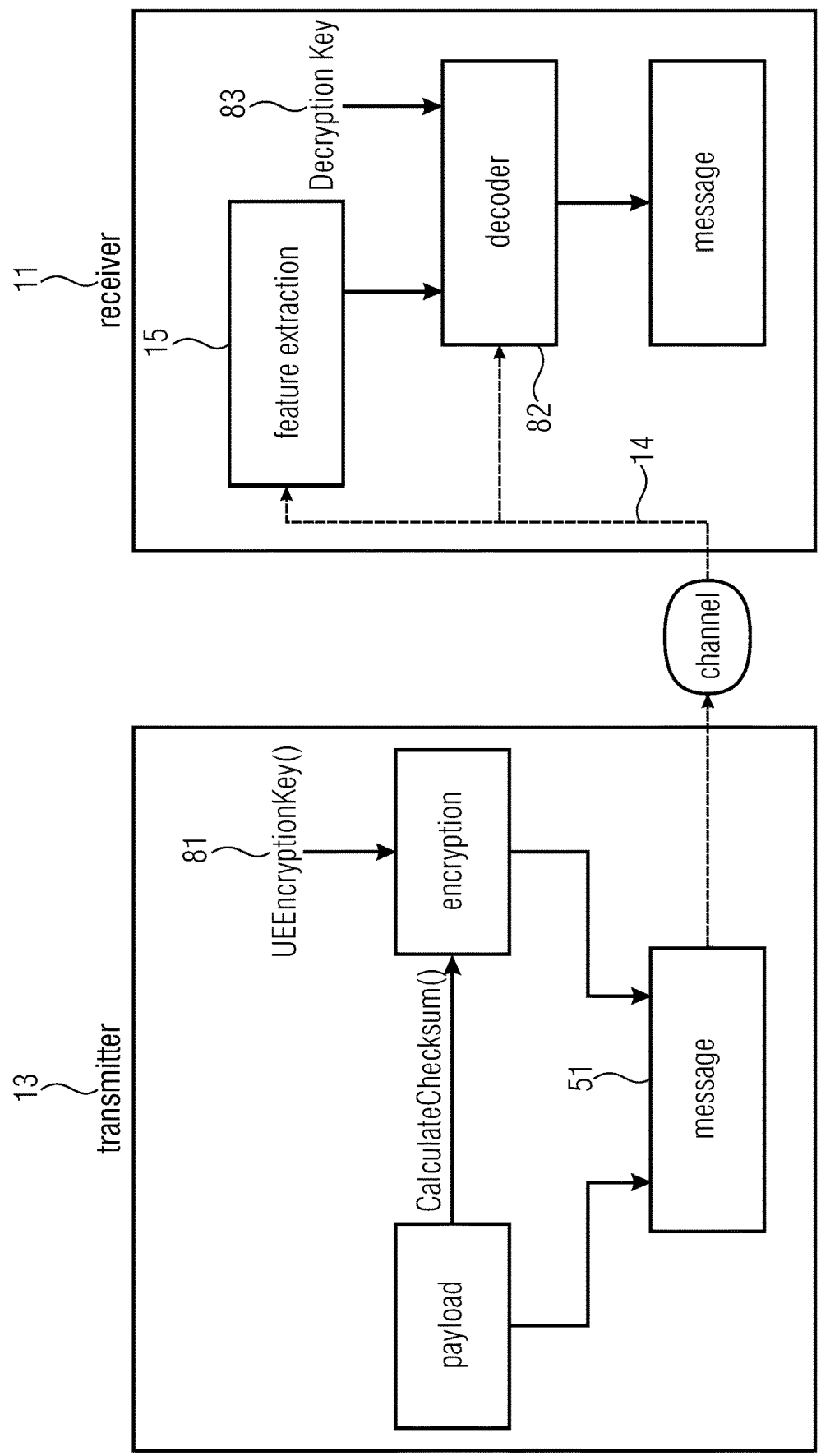
FIG. 8 shows a block diagram of encrypting and decrypting a message using a user equipment identifier according to an example.

FIG. 8 shows a further example of the invention, wherein message decryption in authentication processes is supported by means of the at least one determined signal property 15.

A transmitter, which may be a UE 13 in uplink mode, may authenticate itself towards a receiver, which may be a base station 11 in uplink mode, by encrypting the checksum of a message 51 with its private key 81, or for the symmetric case, by a key known to both transmitter 13 and receiver 11. The receiver 11 will decrypt the checksum and verify the result against its own checksum calculation.

In conventional systems, if the ID of the transmitter 13 (e.g. an UE-identifier 16) is not part of the message 51, the receiver 11 will only know who sent the message upon successful decryption of the checksum. I.e., after the decoder has selected the appropriate key, which implicitly identifies the transmitter 13. Since the decoder has to iteratively try each decryption key, the process may be computational expensive.

However, according to the invention, this process may be accelerated if physical features of the transmitter 13, i.e. the at least one determined signal property 15, is/are taken into account, such as depicted in FIG. 8.

According to an example, the user equipment 13 is configured to encrypt a message 51 using a user equipment specific encryption key 81 and to transmit said encrypted message 21 by means of a radio signal 14.

The base station 11 is configured to receive said radio signal 14 from the user equipment 13 and to determine at least one signal property 15 of said received radio signal 14.

The base station 11 is further configured to decrypt the encrypted message 51 using a decryption key 83, wherein the decryption key 83 is selected based on the at least one determined signal property 15.

In an embodiment where all features are collected in a vector (e.g. as described above), a metric may be defined or a classifier may be trained to provide a notion of distance between a given reference signal and the signal of a specific user equipment 13. By doing so, the following algorithm may be used

```
feat_new = calc_features(received_signal)
//select the UE with the closest signal to feat_new
for i in #UEs_within_cell
    if decode_message(get_decryption_key(UE)) == success
        break
    else
        select next closest UE
    end
end
```

Thus, according to an example, the base station 11 may be configured to compare the at least one determined signal property 15 of the received radio signal 14 with previously determined reference signal properties of previously received radio signals, and the base station 11 may further be configured to select the decryption key of that one previously determined signal property which comprises the highest correlation with the at least one determined signal property 15 of the received radio signal 14.

If the selected decryption key was not correct, the base station 11 tries the next closest UE 13. In more detail, the base station 11 tries the decryption key related with that one user equipment 13 comprising a signal property 15 having the next highest correlation with the previously determined signal property.

Thus, according to an example, if the decryption key of that one previously determined signal property which comprises the highest correlation with the at least one determined signal property of the received radio signal 14 was incorrect, the base station 11 may be configured to use the decryption key of that one previously determined signal property which comprises the next highest correlation with the at least one determined signal property 15 of the received radio signal 14.

The base station 11 may search the decryption keys until the correct decryption key was found. However, compared to common methods, the time for searching the correct decryption key is significantly reduced due to the exploitation of the at least one determined signal property 15.

Figure 9:
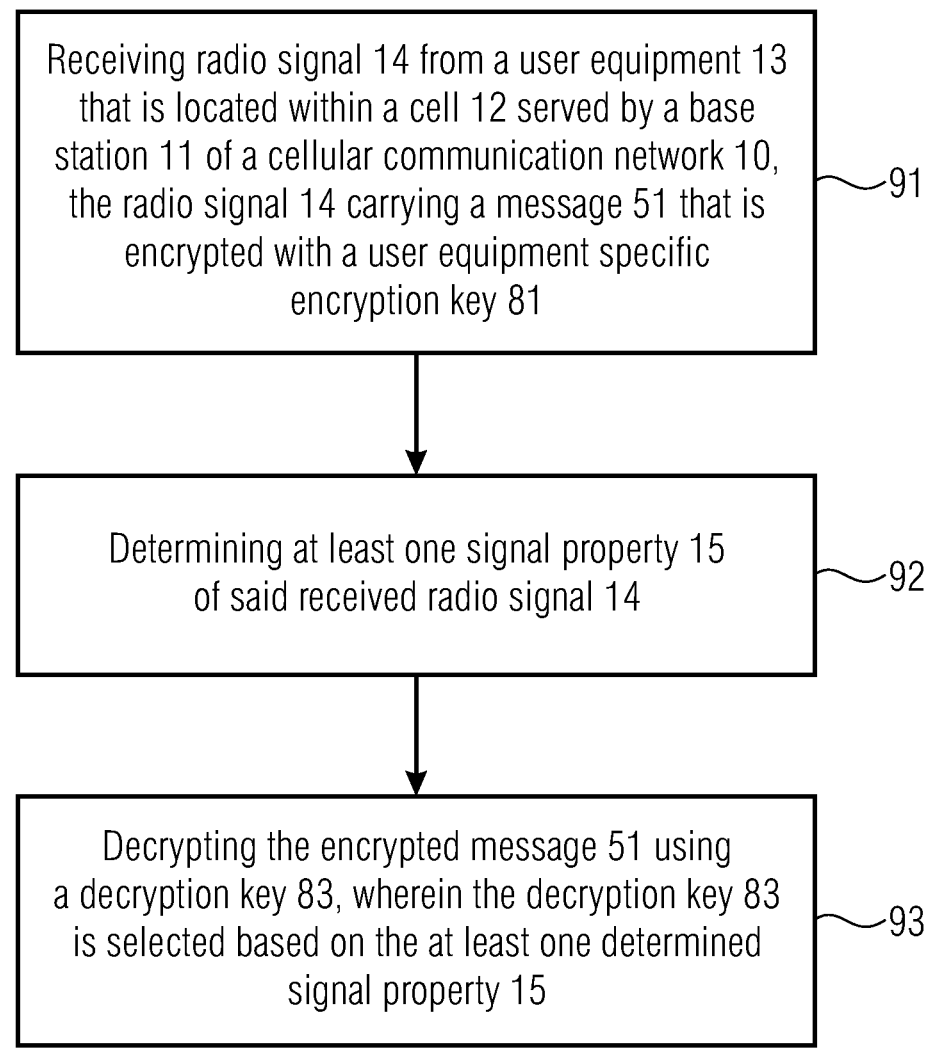
FIG. 9 shows a block diagram of an inventive method according to an example.

FIG. 9 shows a corresponding method for decryption enhancement according to an example.

In block 91, a radio signal 14 from a user equipment 13 that is located within a cell 12 served by a base station 11 of a cellular communication network 10 is received, the radio signal 14 carrying a message 51 that is encrypted with a user equipment specific encryption key 81.

In block 92, at least one signal property 15 of said received radio signal 14 is determined.

In block 93, the encrypted message 51 is decrypted using a decryption key 83, wherein the decryption key 83 is selected based on the at least one determined signal property 15.

In the following, the invention shall be summarized in other words:

In current mobile networks, devices 13 that transmit a message are typically identified by the time/frequency resources they use and which were previously assigned by the base station 11 or an source-identifier that is part of the message.

The identifier can become large, especially for IoT networks with many devices 13. To shorten this identifier or even completely omit it, a fingerprinting scheme based on device specific properties is proposed.

A full identification of the device 13 is needed only once and future messages can be associated with a unique device 13, based on properties 15 contained in the device transmit signal 14 (e.g. angle-of-arrival, power-delay-profile, or higher layer payload features, e.g. destination IP/Port).

This principle can further be used in combination with encrypted messages. The key used for encryption can be seen as unique identifier. The properties 15 of the source-device (e.g. UE 13) of a message can accelerate the decoding process:

The base station 11 needs to trial multiple decryption keys, if the source device 13 is not known beforehand. Taking into account the device properties 15, only a subset of all keys (all devices associated with a base station 11) needs to be trialed.

Problem

Internet-of-Things (IoT) networks are expected to have a very high density of devices 13. Thus, relatively long identifiers will be needed to address each device 13 and/or each radio bearer that a device 13 opens for a certain service. This increases the number of bits to be transmitted (e.g. signaling for UE authentication to the network) and therefore also the power consumption.

State-of-the-Art: Identification of Devices in LTE

Currently in LTE networks, the cell radio network temporary identifier (C-RNTI) identifies a UE 13 having a RRC (Radio Resource Control) connection within a cell 12 and scheduling is dedicated to a particular UE 13. The C-RNTI is a bit string of size 16 [1, p.412] and its value can range from 1 to 65523 (0x0001 to 0xFFF3). It might be even possible that the 16 bit C-RNTI will be extended to support mobility in future releases. The eNB 11 assigns different C-RNTI values to different UEs 13 but it is unique only within one cell 12. C-RNTI is used for the user-specific decoding of signaling/control information on physical channels e.g. by scrambling the CRC with the C-RNTI [2].

However, C-RNTI is not used for the uplink transmission, since resource assignment is signaled by the eNB 11. Thus, the eNB 11 is aware on which uplink resources the corresponding UEs 13 are scheduled. Nevertheless, in the case of NB-IOT, eMTC and mMTC, it might be not beneficial to assign exclusive uplink transmission resources to a single UE 13. In this context an identifier, like exemplary the C-RNTI, could be of use to uniquely link the uplink signal to the corresponding UE 13.

In the following, some of the above described examples of the present invention are explained in other words:

E1. Supporting C-RNTI with Physical UE Parameters to Allow RNTI Reuse within One Cell while Also Enabling Variable/Shorter C-RNTI Sizes It is proposed to exploit fingerprinting of physical UE characteristics 15 in addition to the current UE identification based on C-RNTI. Consequently, RNTI may be reused within UEs 13 of one cell 12 and its length in bits may be shortened or kept variable which potentially allows signaling reduction.

Such a scheme could be especially helpful in IoT scenarios where some devices are stationary, resulting in rather static link conditions. Also for wireless communication in processes with repeated patterns/tracks and almost constant environment, the radio link may be strongly correlated at re-occurring spots/segments/positions, see e.g. studies on wireless control of discrete manufacturing processes in [3].

Application Example

Initial Feature Exploitation and Storage in Databases at eNB 11 Using Appropriate Channel/Feature Exploitation Signals:

Assume that eNBs 11 maintain a database to store physical features 15 of the (connected) UEs 13. The initial feature computation for e.g. UE 'A' $13_1$ may be performed during the RACH procedure of UE 'A'. The (serving) eNB 11 analyses appropriate physical properties 15 of the UE transmit signals 14.

In order to gain more detailed radio channel information (e.g. in terms of high channel resolution) and to exploit small variations in fingerprints, an optional feature could be to allow initial transmissions of short high-power impulses that spread over a large bandwidth in the frequency domain. A precondition to run such a scheme is system support for short-term exploitation of out-of-band frequency areas. Otherwise, the channel characteristics, from which the physical properties 15 are derived, can be exploited within the covered bandwidth.

These properties 15 are stored into the database. As shown in FIG. 2B, an eNB 11 maintains N sets of UE identifiers 16 (e.g. RNTIs) c_n, where there are different RNTIs within each individual set n∈N but RNTIs re-occur over all sets, i.e. c_1=c_2= . . . =c_N.

If the correlation of the considered physical properties 15 of UE 'A' $13_1$ and UE 'B' $13_2$ is high, both UEs $13_1$, $13_2$ will be assigned a RNTI from the same set, ensuring a distinction via different RNTIs.

If, on the other hand, the correlation is low, both UEs $13_1$, $13_2$ can be assigned the same RNTI (from different sets) since it is still possible to differentiate the two by their physical properties 15.

In case of mobility (or in general), an update of the feature storage process could be either message-triggered or be obtained periodically.

After the initial PRACH procedure, the UL (Uplink) UE 13 may transmit in a one-shot manner where identification is by group/set ID together with physical properties 15 at eNB 11.

Examples for Device-Specific Properties:

Some potential physical properties 15 to be analyzed individually or combined (to derive a better measure) are listed below:

Channel impulse response, e.g. shown in [4]: Power Delay Profile (PDP), Power Spectral Density (PSD)

Signal strength: Received Signal Strength Indicator (RSSI), Reference Signal Received Power (RSRP)

Angle(s) of Arrival

Data on UE position (e.g. along a track, in a specific environment)

MIMO channel statistics (in case multiple antennas are used)

IQ Imbalance in MIMO [5]

Variance/bias of the UE carrier frequency

UE transmit filter shape; PA nonlinearities of the UE

It might also be possible to utilize other, not directly physical but device-specific properties such as:

Payload sent: Destination (IP), length and content

One approach (not excluding other options) for the collection of such signal properties 15 could be the construction of a feature vector of the following type $$a = [h^T, f_{\mathit{off}}, \sigma_{f_{\mathit{off}}}, \Theta, \Phi]^T$$

as described, for example, in reference [4], where the samples of the CIR (Channel Impulse Response) are collected in vector h which comes together with the collection of other features in vector a, possibly normalized by the variance of the respective feature.

For example, each RNTI group c_i may be characterized by a single feature vector a_i, which might be an average of the feature vectors of all UEs 13 already included in that specific group. A new UE 13, so far unknown to the eNB 11, transmits a random access burst, then the features are calculated/estimated and vector a_new is established. Some distance metric of $a_{new}$ to all vectors a_i is minimized, e.g.

$$\min_i \|a_{new} - a_i\|$$

where ||.|| denotes an arbitrary norm (NOTE: alternatively, each vector can be mapped to a different metric space and distances can be computed in this mapped feature vector). After solving the above optimization problem, the UE 13 can be assigned to group 'i' if not already full. If UE 13 with same RNTI is already in the same group, a possible solution is to have them run on different DRX cycles or differentiate the control channel in frequency.

Extension Towards Cloud-Based Data Storage:

Assume the eNB 11 maintains a cloud database, i.e. information on device-specific features 15 (fingerprints) can be exchanged with neighbor eNBs 11 which also collects fingerprints. Then, it is proposed to provide a cloud service to help identifying the transmitting UE 13.

E2. Full UE Identification Based on Physical UE Parameters without Use of RNTI for UEs within One Cell In this example, it is proposed an option of fingerprint-based device identification solely based on device-specific features as described in example E1 above (after the initial RACH procedure). This could be applicable for networks with highly static environments.

E3. Enhanced Message Decoding

E3.1. Support of Message Decryption in Authentication Processes by Using Physical UE Parameters As shown in FIG. 8, a sender (e.g. UE 13) may authenticate itself towards the receiver (e.g. eNB 11) by encrypting the checksum of a message with its private key 81, or for the symmetric case, by a key known to both sender 13 and receiver 11. The receiver 11 will decrypt the checksum and verify the result against its own checksum calculation.

If the sender ID 16 is not part of the message, the receiver 11 will only know who sent the message upon successful decryption of the checksum, i.e., after the decoder has selected the appropriate key, which implicitly identifies the sender 13. The process may be computational expensive, but can be accelerated if physical features 15 of sender 13 are taken into account.

Application Example

In an embodiment, where all features are collected in a vector (e.g. as described in example E1 above), a metric can be defined or a classifier can be trained to provide us with a notion of distance between a given reference signal and the signal of a specific user. By doing so, we can use the following algorithm:

```
feat_new = calc_features(received_signal)
//select the UE with the closest signal to feat_new
for i in #UEs_within_cell
    if decode_message(get_decryption_key(UE)) == success
        break
    else
        select next closest UE
    end
end
```

E3.2. Accelerated Sender Identification by Using Physical UE Parameters.

Figure 6:
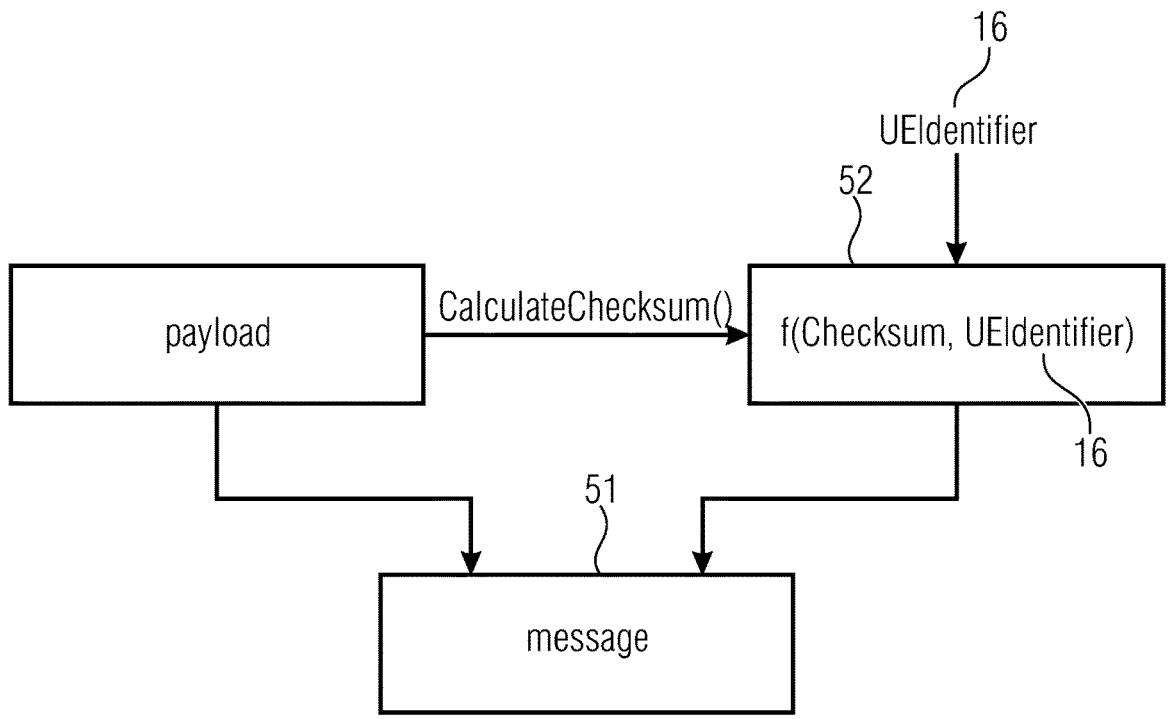
FIG. 6 shows a block diagram of scrambling a checksum in combination with a user equipment identifier according to an example.

As shown in FIG. 6, an eNB 11 may identify a transmitting device 13 (in uplink) based on a scrambled checksum. The scrambling sequence that was used to alter the checksum, identifies the sender 13.

In order to accelerate the search process for the correct UE-Identifier 16, the physical features 15 of the receive signal are used. That is, identifiers with a higher likelihood with respect to the physical features 15 are tested first.

E4. Collision Reduction of Random Access Attempt and C-RNTI Response

As shown in FIGS. 3, 4 and 5, a fingerprinting approach by spatial separation for C-RNTI can be exploited for the random access procedure. In legacy systems a collision in the random access attempt occurs whenever two devices $13_1$, $13_2$ randomly select the same random access sequence for the same PRACH from the sequence pool. However, if the random access preambles are separated through receive beams 31, 32 a collision can be avoided. The eNB 11 can detect both random access preambles separately through both receiver beams 31, 32. Consequently, the eNB 11 can initiate a random access response for both UEs $13_1$, $13_2$, incorporating the corresponding transmission beam 31, 32. There are two options for the reported C-RNTI 16.

(1) For both UEs $13_1$, $13_2$ the same C-RNTI 16 is used, so that in the following the UEs $13_1$, $13_2$ are targeted by the combination of C-RNTI 16 and spatial beamforming.

(2) The corresponding initial receive beam is incorporated into the C-RNTI 16. Consequently, both users $13_1$, $13_2$ are uniquely identified by the C-RNTI 16 independently from the spatial beamforming and therefore their position.

Benefits of the Invention

Reduced power consumption of the IoT-UE.

Radio resource savings due to less (explicitly) transmitted information bits.

Possibility for ID sharing.

Reduced decoding delay and computation time in the eNB

This approach works well for mainly static devices/UEs.

Application Fields

IoT Cellular Networks (NB-IoT, mMTC, eMTC), Sensor Networks, mmWave Networks

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Depending on certain implementation requirements, embodiments of the invention may be implemented in hardware or in software. The implementation may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A cellular communication network comprising a base station serving a radio cell and at least one user equipment located within said radio cell, wherein the base station is configured to receive a radio signal from the user equipment and to determine at least one signal property of said received radio signal, wherein the base station is further configured to assign a user equipment identifier to said user equipment based on the a least one determined signal property, wherein the base station comprises a first group of user equipment identifiers and a second group of user equipment identifiers, wherein at least one of the user equipment identifiers of the first group is identical to at least one of the user equipment identifiers of the second group, or wherein all of the user equipment identifiers of the first group are identical to the user equipment identifiers of the second group.

2. The cellular communication network of claim 1, wherein the base station is configured to selectively assign either a user equipment identifier of the first group or a user equipment identifier of the second group to a user equipment based on the at least one determined signal property of said user equipment.

3. The cellular communication network of claim 1, wherein the base station is configured to receive a first radio signal from a first user equipment and a second radio signal from a second user equipment and to determine an amount of correlation between the first and second radio signals, wherein the base station is configured, based on the determined amount of correlation, to either assign a user equipment identifier of the first group to the first user equipment and a user equipment identifier of the second group to the second user equipment, or to assign different user equipment identifiers of the first group to each of the first and the second user equipment.

4. The cellular communication network of claim 3, wherein, if a first user equipment and a second user equipment are assigned the same user equipment identifier within the same group of user equipment identifiers, the base station is configured to have the first and second user equipments run on different discontinuous reception cycles or to differentiate the control channel in frequency.

5. The cellular communication network of claim 1, wherein the base station is configured to store the at least one determined signal property of the radio signal of the user equipment together with the assigned user equipment identifier of said user equipment in a database.

6. The cellular communication network of claim 1, wherein the base station is configured to store the at least one determined signal property of the received radio signal of the user equipment into a specific user equipment feature vector.

7. The cellular communication network of claim 6, wherein the base station comprises a first group of user equipment identifiers and a second group of user equipment identifiers, wherein the base station is configured to create a first group feature vector for the first group of user equipment identifiers and a second group feature vector for the second group of user equipment identifiers, wherein each of the group feature vectors comprises the average of all of the specific user equipment feature vectors of those user equipments that are already comprised in the respective group of user equipment identifiers.

8. The cellular communication network of claim 7, wherein the base station is configured to compare the specific user equipment feature vector of the user equipment with at least the first group feature vector of the first group of user equipment identifiers, and wherein the base station is further configured to
either assign a user equipment identifier of the first group of user equipment identifiers to the user equipment if a difference between the user equipment feature vector and the first group feature vector is below a predetermined threshold value,
or to assign a user equipment identifier of the second group of user equipment identifiers to the user equipment if a difference between the user equipment feature vector and the first group feature vector exceeds a predetermined threshold value.

9. The cellular communication network of claim 1, wherein the user equipment identifier is a RNTI (Radio Network Temporary Identifier).

10. The cellular communication network of claim 1, wherein the at least one signal property is a physical signal property comprising at least one of a channel impulse response, a power delay profile, a signal strength, an Angle of Arrival, data regarding the position of the user equipment, a MIMO channel statistic, an IQ imbalance in MIMO, a variance or bias of the carrier frequency of the user equipment, or a user equipment transmit filter shape.

11. The cellular communication network of claim 1, wherein the base station is configured to determine the at least one signal property from a transmitted payload, the payload comprising at least one of a destination information, a length information and a content information.

12. The cellular communication network of claim 1, wherein the base station is configured to determine the at least one signal property of said received radio signal of the user equipment during a RACH (Random Access Channel) procedure of said user equipment.

13. The cellular communication network of claim 1, wherein the base station is configured to receive a receive beam originating from a user equipment, the receive beam carrying the radio signal, and wherein the base station is further configured to determine, as the at least one signal property of said radio signal, the direction of said receive beam in order to estimate the position of the user equipment, and to assign a user equipment identifier to the user equipment, the user equipment identifier depending on the determined direction of the receive beam.

14. The cellular communication network of claim 13, wherein the base station is configured to assign a user equipment identifier to a first user equipment at a first position and to assign the same user equipment identifier to a second user equipment at a second position, and wherein the base station is further configured to transmit, by means of spatial beam forming, a transmission beam carrying a transmission radio signal selectively to either the first user equipment or the second user equipment depending on the previously determined direction of the receive beam.

15. The cellular communication network of claim 13, wherein the base station is configured to assign a user equipment identifier to a first user equipment at a first position and to assign the same user equipment identifier to a second user equipment at a second position, and wherein the base station is further configured to transmit a transmission radio signal to be received by both the first and the second user equipment, wherein the transmission radio signal comprises the user equipment identifier and a position information of that one user equipment that is the intended recipient of the transmission radio signal.

16. The cellular communication network of claim 1, wherein the base station is configured to receive, from the user equipment, short high-power impulses that spread over a large bandwidth in the frequency domain comprising out-of-band frequency areas, wherein the base station is configured to determine the at least one signal property from said short high-power impulses.

17. The cellular communication network of claim 1, wherein the user equipment is configured to generate a message comprising a checksum, wherein the checksum is calculated by a combination with the user equipment identifier of the user equipment, and wherein the user equipment is further configured to transmit said message by means of a radio signal.

18. The cellular communication network of claim 17, wherein the base station is configured to receive the radio signal comprising the message comprising the checksum, and wherein the base station is further configured to select, based on the at least one determined signal property of said received radio signal, the correct user equipment identifier for re-calculating the checksum.

19. A base station for a cellular communication network,
wherein the base station is configured to receive a radio signal from a user equipment that is located within a cell served by said base station,
wherein the base station is further configured to determine at least one signal property of said received radio signal, and
wherein the base station is configured to assign a user equipment identifier to said user equipment based on the determined signal property,
wherein the base station comprises a first group of user equipment identifiers and a second group of user equipment identifiers, wherein at least one of the user equipment identifiers of the first group is identical to at least one of the user equipment identifiers of the second group, or wherein all of the user equipment identifiers of the first group are identical to the user equipment identifiers of the second group.

20. A method comprising
receiving a radio signal from a user equipment that is located within a radio cell served by a base station of a cellular communication network,
determining at least one signal property of said received radio signal, and
assigning a user equipment identifier to said user equipment based on the at least one determined signal property, wherein the method comprises having a first group of user equipment identifiers and a second group of user equipment identifiers, wherein at least one of the user equipment identifiers of the first group is identical to at least one of the user equipment identifiers of the second group, or wherein all of the user equipment identifiers of the first group are identical to the user equipment identifiers of the second group.

21. A non-transitory digital storage medium having stored thereon a computer program product for performing a method comprising receiving a radio signal from a user equipment that is located within a radio cell served by a base station of a cellular communication network, determining at least one signal property of said received radio signal, and assigning a user equipment identifier to said user equipment based on the at least one determined signal property, when said computer program is run by a computer, wherein at least one of the user equipment identifiers of a first group is identical to at least one of the user equipment identifiers of a second group, or wherein all of the user equipment identifiers of the first group are identical to the user equipment identifiers of the second group.

* * * * *